United States Patent [19]

Carlson et al.

[11] 4,417,100

[45] Nov. 22, 1983

[54] EMERGENCY DIALER SYSTEM

[75] Inventors: Alan J. Carlson, Smithtown; Venerando J. Indelicato, Garden City, both of NY

[73] Assignee: Metro-Tel Corp., Syosset, N.Y.

[21] Appl. No.: 280,529

[22] Filed: Jul. 6, 1981

[51] Int. Cl.$^3$ .................................. H04M 11/04
[52] U.S. Cl. .................................. 179/5 R; 179/5 P
[58] Field of Search .................. 179/5 R, 5 P, 90 BD

[56] References Cited

U.S. PATENT DOCUMENTS

| | | | |
|---|---|---|---|
| 3,427,401 | 2/1969 | Waddell | 179/5 P X |
| 3,519,749 | 7/1970 | Kline | 179/5 R X |
| 3,582,555 | 6/1971 | Kok | 179/5 R |
| 3,598,919 | 8/1971 | Lott | 179/5 P |
| 4,064,368 | 12/1977 | Dibner | 179/5 R |
| 4,219,698 | 8/1980 | Birilli et al. | 179/5 P |

FOREIGN PATENT DOCUMENTS 2051520  1/1981  United Kingdom .............. 179/5 R

Primary Examiner—G. Z. Rubinson
Assistant Examiner—Keith E. George
Attorney, Agent, or Firm—Holland, Armstrong, Wilkie & Previto

[57] ABSTRACT

The present invention is directed to a means of alerting a distant party through a telephone call and a predetermined alarm that a distressed party has activated a distress button. The distressed party indicates an emergency and summons help by pressing a pad button or by means of a remote transmitter without actually going to a telephone. The transmitter signals a receiver by means of a radio frequency and triggers the receiver so that a predetermined telephone number is dialed and an emergency alert is placed on the line for a predetermined amount of time. After an additional period for verification of any emergency, the time sequence is repeated.

13 Claims, 1 Drawing Figure

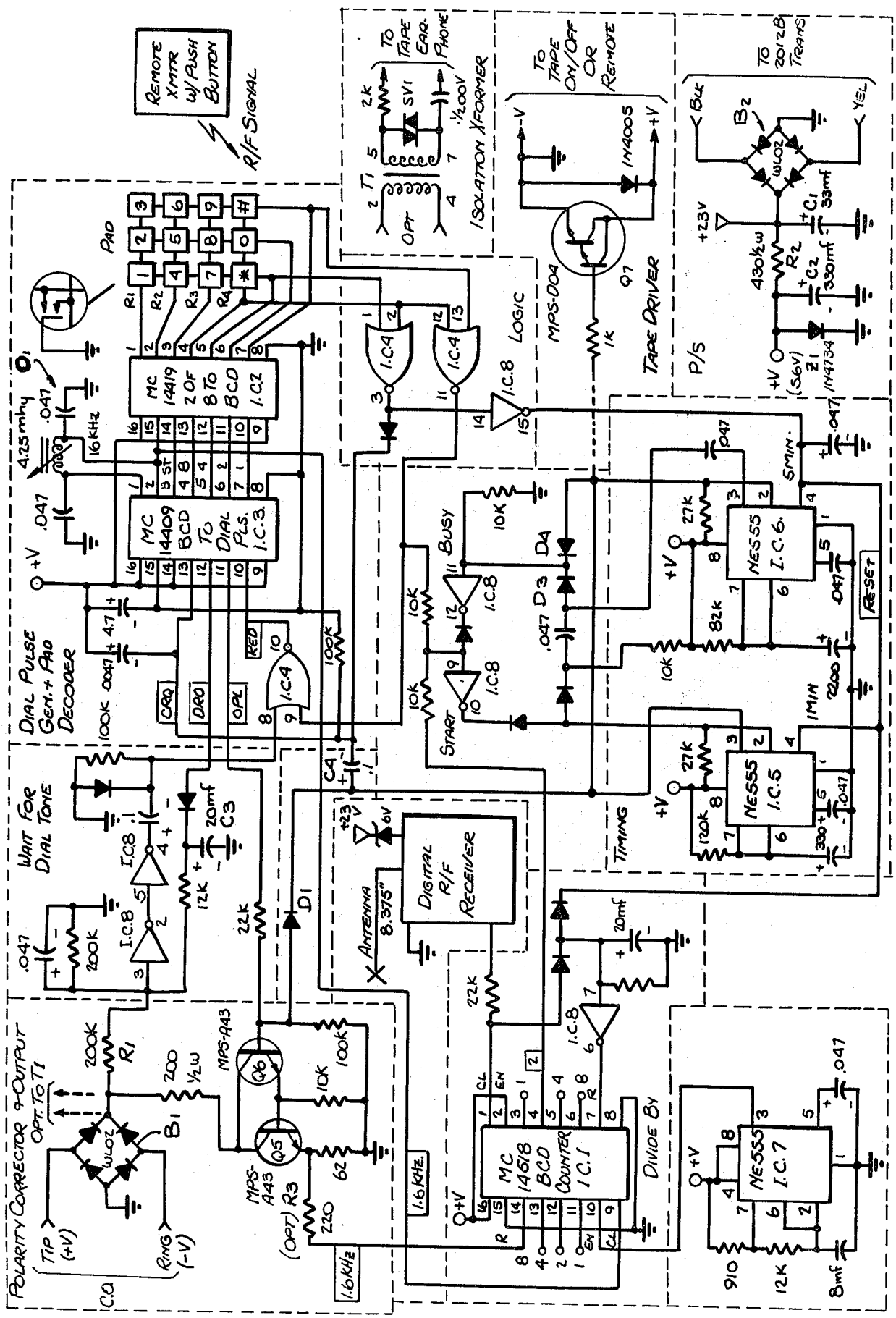

EMERGENCY DIALER SYSTEM

DESCRIPTION OF THE INVENTION

The present invention is directed to an emergency dialer system and more particularly to an emergency dialer system which will be an improvement over existing systems. Numerous dialer systems have been devised over the years in which a predetermined telephone number is dialed automatically in order to alert the dialed number of an emergency.

One of the drawbacks of these existing systems is the fact that the emergency message is not repeated for a sufficient length of time to allow the called party to verify an emergency.

Another drawback of existing systems is the lack of sufficient time to permit the person called to verify an emergency.

Another drawback of existing systems is the fact that such systems are often accidentally initiated even when there is no emergency.

The present invention avoids these drawbacks and provides an emergency dialer system and more specifically a means and mechanism for alerting a distant party through a telephone call and predetermined alarm that another party is undergoing an emergency and needs assistance. The distressed party has indicated an emergency and has summoned help by means of a remote transmitter and without actually going to the telephone.

The transmitter will signal a receiver by means of a predetermined radio frequency and trigger the receiver so that a predetermined telephone number is dialed. After dialing the predetermined number, an emergency alert, such as a warble tone, which is easily identified and compatible with the telephone network, is placed on the telephone line for a predetermined time, e.g. one minute. This allows ample time for the called party to reach the incoming phone call, lift the receiver and hear the tone. Having heard the tone, the called party will dial the caller's number and verify that a true emergency exists.

A waiting period of a predetermined time, e.g. five minutes, may occur in which time verfication of the distress call can be made by the called party. If there is no verification, the receiver will repeat the one minute and five minute sequence again and the sequence will be repeated indefinitely until manually reset. The verification of a distress call can be made at any time during the predetermined waiting period and this may be done by the called party calling the distressed party back. If there is no answer at the distressed party, then the caller knows that a real emergency may exist.

Manual reset of the system is caused by pushing the asterisk button on the receiver module and after reset, the unit is ready to repeat operation. Both the receiver and the transmitter are of the digital presetable types in which only matched coding can produce results. This results in a substantial reduction of false triggering by other means. One object of the present invention is the provision of an improved emergency dialer system which can be activated by someone in distress either directly or remotely.

Another object of the present invention is the provision of an improved emergency dialer system which will automatically dial a predetermined number and which will place an emergency signal on the line for a predetermined length of time.

Another object of the present invention is the provision of an improved emergency dialer system in which the system automatically includes a predetermined verification time to give the person called sufficient time to verify an emergency.

Another object of the present invention is the provision of an improved emergency dialer system in which the system automatically re-dials the emergency number if there is no verification within a predetermined time.

Another object of the present invention is the provision of an improved emergency dialer system which will seize the line of the telephone dialed so that other calls will not interfere with the emergency message.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings forming a part of the specification, wherein:

The single FIGURE in the drawing is a diagrammatic plan view of the circuitry of the present invention.

The central office line C.O. is connected to a WLO2 bridge $B_1$ in any polarity (TIP & RING). RING ($-V$) is referenced through the bridge to ground in this floating circuit. TIP ($+V$) is fed to a resistor $R_1$ (200 OHM) and to transistors Q5 and Q6, which constitute a darlington pair. Transistors Q5 and Q6 are normally off until the circuit is triggered through manual start or when the transmitter distress button is activated.

Power is applied to the circuit through another WLO2 bridge $B_2$ on the terminals marked "BLK" and "YEL". A 2012B type, U.L. listed class 2 transformer (not shown) reduces the incoming 117 V to a suitable voltage into the circuit. The full wave rectified voltage is fed from the bridge $B_2$ to a capacitor $C_1$ (33 mf $+23$ V) and into a resistor $R_2$ (430 OHM) to a capacitor $C_2$ (330 mf). A Zener Diode $Z_1$ (IN4734) regulates the voltage ($+5.6$ V) and becomes a feed point to the rest of the circuit.

Starting the operation of the unit is caused either from the remote transmitter or by manually depressing the [#] button on the keyboard pad. Manual activation is started by pressing the [#] button which signal is decoded through gate I.C.4 pins 13 and 12 and sent out of pin 11 of I.C.4 to pin 9 of amplifier I.C.8. Remote activation is caused by a signal sent from the transmitter to the receiver. The signal is decoded by the receiver assembly and sent to pin 1 of counter I.C.1. I.C.1 counts two pushes from the transmitter and the two pushes should occur within three to four seconds. This eliminates false triggering from the transmitter, e.g. bumping the push button accidentally. This push time is generated through R-C time constants on pin 7 of I.C.8 which hold the reset lead pin 7 on counter I.C.1 low during this time. The output from pin 4 of counter I.C.1 goes to pin 9 of I.C.8.

Whether the circuit is activated manually or remotely, the start signal from pin 10 of I.C.8 goes to pin 2 of a timer I.C.5, which is preferably a one minute timer. The one minute time period is controlled by R-C timing components on pins 6 and 7 of timer I.C.5. When pin 2 of timer I.C.5 goes low, the timer starts its timing cycle and the output on pin 3 goes high.

Pin 3 of timer I.C.5 connects with a busy circuit in cooperation with diodes $D_2$ and $D_3$ and with the base of transistor Q6 through a clamp diode $D_1$. When pin 3 of timer I.C.5 is high, the clamp voltage is released and transistor Q6 is allowed to turn on through a high voltage from pin 11 of decoder I.C.3, OPL lead. The busy circuit, i.e. pin 11 on I.C.8, senses either pin 3 of I.C.5 or pin 3 of I.C.6 through diodes $D_2$ and $D_3$. Pin 12 of I.C.8 holds pin 9 of I.C.8 low and this keeps I.C.5 and I.C.6 in sequence by inhibiting new start signals.

With Q6 turned on through the OPL lead, Q5 turns on and draws current from bridge $B_1$. This, in turn, seizes the central office line (C.O.). When a dial tone appears (shortly after seizure) a momentary loss in C.O. current occurs. Pin 3 of I.C.8 senses this voltage change and this voltage change is passed along to output pin 4 of I.C.8. The output of pin 4 of I.C. 8 passes through a differential circuit out of pin 10 I.C.4 to I.C.3 through pin 10 (RED). I.C.3 reacts to signal on pin 10 RED and commences to dial a stored telephone number. This telephone number is preferably a series of low and high signals which leave I.C.3 through pin 11 on line OPL. Darlington pair Q5 and Q6 react to these signals and turn on and off following decoder I.C.3. This, in turn, causes loop current to the C.O. to follow—thus simulating a rotary dial. After the dialing sequence is completed, pin 11 of I.C.3 stays high, keeping loop current on in C.O. This allows ample time for the call to complete its path and ring the dialed number.

The cell will stay completed until timer I.C.5 time runs out, which is preferably timed for one minute. When the I.C.5 time runs out, pin 3 of I.C.5 goes low and Q6 will then be clamped off by the clamp diode $D_1$. This, in turn, releases the C.O. and releases or drops the telephone line. When timer I.C.5 goes low, it starts timer I.C.6 through pin 2. Pin 3 then goes high allowing the busy circuit to function as set forth hereinabove. The time interval of preferably five minutes of timer I.C.6 is controlled by R-C components on pins 6 and 7, thereof. When the time on I.C.6 has passed, pin 3 of I.C.6 goes low and causes an input to pin 2 of I.C.5, resulting again in the one minute interval. This, in turn, starts the dialing again.

The above action of I.C.5 and I.C.6 continues indefinitely until the asterisk [*] button on the keyboard is pushed. Pins 1 and 2 of I.C.4 sense the signal from the asterisk button and pin 3 sends a high signal to pin 13 of I.C.3 (CRQ) and causes all dialing action to be reset. Additionally, pin 3 of I.C.4 sends a signal to pin 14 of I.C.8 which outputs to the reset lines on pins 4 of I.C.5 and I.C.6.

A 1.6 KHz L-C oscillator $O_1$ on pins 1 and 2 of I.C.3 sets up proper dialing times so as to enable I.C.3 to dial at proper speeds for telephone C.O. compatability. This oscillator $O_1$ also feeds pins 9 of counter I.C.1 which divides the frequency by ten. This 1.6 KHz signal then leaves pin 14 of I.C.1 and is directed to the emitter of Q5. A resistor $R_3$ (220 OHM) in this path controls the amplitude of the 1.6 KHz tone. When Q5 is on, the tone is felt on the telephone line. The oscillator I.C.7 is a free running 2-3 Hz oscillator whose output on pin 3 is fed to pin 10 of counter I.C.1. This causes an interrupted signal to come from pin 14 of I.C.1.

Number entry to I.C.3 is through pins 3,4,5,6,7 from I.C.2. I.C.2 is a 2 of 8 decoder which converts the button closures of the pad to BCD signals, with strobe, for I.C.3. Pin 12 of I.C.3 DRO goes high during outgoing dialing and charges a capacitor $C_3$(20 mf). This positive voltage holds pin 3 of I.C.8 high to prevent the dialing pulses from affecting pin 10 RED of I.C.3. Each time I.C.5 goes high, a positive edge signal goes to pin 13 CRQ of I.C.3 from a capacitor $C_4$ (0.1 mf) causing a momentary reset to I.C.3. This is done in preparation to dial just before dial tone appears.

A modification of the present invention comprises the use of a recorded message which starts a tape deck, with an endless loop cassette, through Q7 when driven by pin 3 of I.C.5. A diode prevents harm to Q7 if power is applied reversed. When Q7 is on, it completes a current path to the tape drive motor and circuits and starts the tape in the playback mode. Signals of the tape, such as identification of party making the emergency call, come from the tape deck and are placed into transformer circuit $T_1$ through plug marked "EAR PHONE". $T_1$ couples this signal to the telephone line at the bridge $B_1$ and resistor $R_1$.

If desired, the interrupted 1.6 KHz tone may be left out when using the tape recorder system. This is done by omitting the resistor $R_3$ on the emitter of Q5. The endless loop tape will play the recorded messages continuously for one minute, then wait for five minutes and repeat until reset through the asterisk [*] button. This is similar to the tone system previously described.

The circuit described above may be housed in a receiver module which may consist of P.C.B. in a plactic box with removable cover. The cover may have a sliding door for access to a telephone type pushbutton pad. This module may also contain an RF receiver assembly to decode the transmitter signals. The 2012B transformer plugs into 117VAC and provides reduced A.C. voltage via external wiring.

The transmitter may be a small pocket type device which may be battery powered. It has a L.E.D. battery test and is digitally matched to the receiver assembly. This prevents accidental false R/F triggering from foreign sources.

It will thus be seen that the present invention provides an improved emergency dialer system which can be activated by someone in distress either directly or remotely, which will automatically dial a predetermined number, which will place an emergency signal on the line for a predetermined length of time. The invention also provides for automatically including a predetermined verification time to give the person called sufficient time to verify an emergency and in which the system automatically re-dials the emergency number if there is no verification within a predetermined time and which will seize the line of the telephone dialed so that the repeated dialing and the distress message will not be interfered with by other calls.

As many and varied modifications of the subject matter of this invention will become apparent to those skilled in the art from the detailed description given hereinabove, it will be understood that the present invention is limited only as provided in the claims appended hereto.

The embodiments of the invention in which an exclusive property or privilege is claimed are defined as follows:

1. An emergency dialer system comprising an emergency circuit, means for triggering a start signal to activate said emergency circuit, means in said emergency circuit for automatically dialing a predetermined telephone number to cause the telephone at said predetermined telephone number to ring, means for applying a predetermined emergency signal on the telephone line of said predetermined number, first timing means for applying said emergency signal on said telephone line for a first predetermined time interval, means for connecting a busy circuit to said first timing means to inhibit further triggering of new start signals, said first timing means interrupting the emergency signal at the end of said first predetermined time interval to permit verification of an emergency, said verification interruption being for a second predetermined time interval, means for resuming the automatic dialing if there is no verification within said second predetermined time interval, said automatic dialing and subsequent verification interruption being repeated until verification occurs.

2. An emergency dialer system as claimed in claim 1 wherein a Darlington pair is included in the circuit.

3. An emergency dialer system as claimed in claim 2, wherein said Darlington pair controls seizure of a central office line to produce a dial tone on the line.

4. An emergency dialer system as claimed in claim 3, wherein said first timing means controls the length of time for the automatic dialing mechanism.

5. An emergency dialer system as claimed in claim 4, wherein said verification interruption is controlled by a second timing means.

6. An emergency dialer system as claimed in claim 5, wherein the automatic dialing and verification interruption continues until a reset circuit is activated.

7. An emergency dialer system as claimed in claim 6, wherein said automatic dialing is at one minute intervals.

8. An emergency dialer system as claimed in claim 7, wherein said second timing means interrupts the automatic dialing for five minutes.

9. An emergency dialer system as claimed in claim 8, wherein said emergency signal is a warble tone.

10. An emergency dialer system as claimed in claim 9, wherein the emergency circuit is started by a push button on a pad.

11. An emergency dialer system as claimed in claim 9, wherein the emergency circuit is started by a remote control circuit.

12. An emergency dialer system as claimed in claim 11, wherein said remote control circuit must be actuated more than once within a prescribed time period in order to activate the system.

13. An emergency dialer system as claimed in claim 9, wherein a tape cassette is adapted to give said emergency signal.

* * * * *